United States Patent
Schaefer et al.

(10) Patent No.: US 8,940,832 B2
(45) Date of Patent: Jan. 27, 2015

(54) POLYMERS AND USE THEREOF AS DISPERSANTS HAVING A FOAM-INHIBITING EFFECT

(75) Inventors: Carsten Schaefer, Muehldorf (DE); Oliver Mogck, Burgkirchen (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 13/581,071

(22) PCT Filed: Feb. 15, 2011

(86) PCT No.: PCT/EP2011/000684
§ 371 (c)(1),
(2), (4) Date: Aug. 24, 2012

(87) PCT Pub. No.: WO2011/103970
PCT Pub. Date: Sep. 1, 2011

(65) Prior Publication Data
US 2012/0322920 A1   Dec. 20, 2012

(30) Foreign Application Priority Data
Feb. 26, 2010 (DE) .......... 10 2010 009 493

(51) Int. Cl.
C08F 220/28    (2006.01)
C08F 216/04    (2006.01)
C04B 24/26     (2006.01)
C08F 220/06    (2006.01)
(Continued)

(52) U.S. Cl.
CPC ............ *C08F 220/28* (2013.01); *C08F 220/06* (2013.01); *C08F 220/14* (2013.01); *C08F 228/02* (2013.01); *C08F 2220/288* (2013.01)
USPC ................. 524/556; 524/3; 524/5; 525/187; 525/404; 525/408; 516/161; 516/181; 516/182; 516/185; 516/191; 95/153

(58) Field of Classification Search
CPC .... C08F 220/28; C08F 220/06; C08F 220/14; C08F 216/04; C08F 2220/288; C08F 228/02; C04B 24/26
USPC .......... 524/556, 3, 5; 516/161, 181, 182, 185, 516/189, 191; 525/187, 404, 408; 95/153
See application file for complete search history.

(56) References Cited

U.S. PATENT DOCUMENTS 4,725,665 A   2/1988   Pieh et al.
5,798,425 A   8/1998   Albrecht et al.
(Continued)

FOREIGN PATENT DOCUMENTS

DE   1238831   1/1965
DE   1671017   2/1966
(Continued)

OTHER PUBLICATIONS

International Searching Report for PCT/EP2011/000684, dated May 13, 2011.
Translation of International Preliminary Report on Patentability of the International Searching Authority for PCT/EP2011/000684, dated May 13, 2011.
English Abstract for DE10017663, Oct. 11, 2001.
English Abstract for DE1238831, Jan. 9, 1965.
English Abstract for DE1671017, Feb. 11, 1965.
English Abstract for DE2948698, Jun. 11, 1981.

*Primary Examiner* — Michael M Bernshteyn
(74) *Attorney, Agent, or Firm* — Tod A. Waldrop

(57) ABSTRACT

The invention relates to polymers that can be obtained by polymerizing the monomers (A), (B), and (D), and optionally (C), where (A) is a monomer of formula (I),

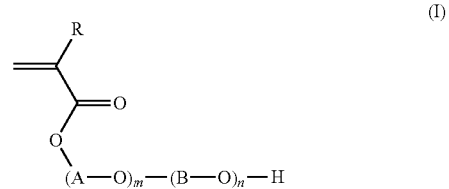

wherein A stands for $C_2$ to $C_4$ alkylene, B stands for a $C_2$ to $C_4$ alkylene different from A, R stands for hydrogen or methyl, m stands for a number from 1 to 500, n stands for a number from 1 to 500, (B) is an ethylenically unsaturated monomer that contains at least one carboxylic acid function, (C) is optionally a further ethylenically unsaturated monomer different from (A) and (B), (D) is a monomer of formula (II),

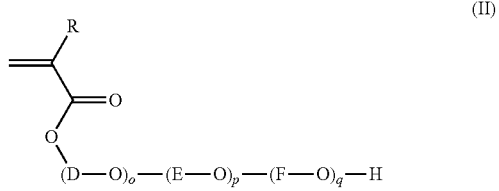

wherein D stands for $C_2$ to $C_4$ alkylene, E stands for a $C_2$ to $C_4$ alkylene group different from D, F stands for a $C_2$ to $C_4$ alkylene group different from E, R stands for hydrogen or methyl, o stands for a number from 1 to 500, p stands for a number from 1 to 500, q stands for a number from 1 to 500, and wherein the weight fraction of the monomers is 35 to 99% for the macromonomer (A), 0.5 to 45% for the monomer (B), 0 to 20% for the monomer (C), and 1 to 20% for the monomer (D), and to the use of said polymers as defoamers for inorganic solid suspensions.

18 Claims, No Drawings

(51) Int. Cl.
  *C08F 220/14* (2006.01)
  *C08F 228/02* (2006.01)

(56) References Cited

U.S. PATENT DOCUMENTS

| | | | |
|---|---|---|---|
| 6,093,862 A * | 7/2000 | Sinquin et al. | 585/15 |
| 6,211,317 B1 | 4/2001 | Albrecht et al. | |
| 6,582,510 B1 | 6/2003 | Schwartz | |
| 6,946,510 B2 | 9/2005 | Suau et al. | |
| 2004/0030206 A1 * | 2/2004 | Dahlmann et al. | 585/15 |
| 2011/0107803 A1 | 5/2011 | Fechner et al. | |
| 2011/0144245 A1 | 6/2011 | Fechner et al. | |

FOREIGN PATENT DOCUMENTS

| | | |
|---|---|---|
| DE | 2948698 | 6/1981 |
| DE | 3530258 | 2/1987 |
| DE | 19513126 | 10/1996 |
| DE | 19834173 | 2/1999 |
| DE | 10017663 | 10/2001 |
| DE | 10 2007 039 783 | 2/2009 |
| DE | 10 2008 038 070 | 2/2010 |
| WO | WO01/96007 | 12/2001 |
| WO | WO 01/96517 | 12/2001 |
| WO | WO 02/066528 | 8/2002 |

* cited by examiner

POLYMERS AND USE THEREOF AS DISPERSANTS HAVING A FOAM-INHIBITING EFFECT

The present invention relates to polymers having a foam-inhibiting effect and to the preparation and use thereof as dispersants for inorganic solid suspensions, in particular pigment suspensions, plasticizers and superplasticizers for hydraulic cement systems, concrete, mortar, gypsum suspensions and anhydrous calcium sulfate binder formulations, for ceramic materials comprising clays, kaolins, feldspars and quartz minerals and for pigment preparations of inorganic white and colored pigments in the paint and coating industry, and leather industry, and as scale inhibitors, dispersants and sequestering agents in the detergent and cleaning agent industry and water treatment. The polymers of the present invention do not require a defoamer to be added to the formulation. The polymer is prepared using an additional monomer to supply the defoaming effect.

Solid suspensions usually contain dispersants or plasticizers for fluidizing and dispersing inorganic solids. Such solids may be cement, gypsum, calcium sulfate hemihydrate, fly ash, kaolin in the building industry, titanium dioxide, calcium carbonate, talc, barium sulfate, zinc sulfite, bismuth vanadate, iron oxide pigments, chromium dioxide, cobalt spinel pigments and other inorganic colored pigments in the paint and coating industry. Dispersants together with sodium carbonate and/or waterglass are also added to ceramic materials comprising clays, kaolins, feldspars and quartz minerals, in order to provide workability and press the green compact into the plaster mold.

Low molecular weight polymers of acrylic acid or copolymers of acrylic acid and maleic acid and the sodium, potassium or ammonium salts thereof are usually used for dispersing kaolin, titanium dioxide and calcium carbonate.

In the building industry, superplasticizers are usually used for plasticizing the concretes for the production of floor coverings, precast concrete, for ready-mixed concrete and lightweight concrete.

Sodium ligninsulfonate is a customary superplasticizer for cement in hydraulically setting building material compositions and for calcium sulfate hemihydrate in renders, masonry mortar materials, plaster laths and for anhydrite screeds.

DE-A-1238831 describes a dispersant, which is prepared by condensation of naphthalenesulfonic acid derivatives and formaldehyde, for cement.

DE-A-1671017 describes the use of melamine resins containing sulfo groups as superplasticizers for concrete.

DE-A-2948698 describes hydraulic mortars for screeds, which contain superplasticizers based on melamine-formaldehyde condensates and/or sulfonated formaldehyde-naphthalene condensates and/or ligninsulfonate and, as binders, Portland cement, clay-containing lime marl, clay and soft-fired clinker ground together.

DE-A-3530258 describes the use of water-soluble sodium naphthalenesulfonate-formaldehyde condensates as admixtures for inorganic binders and building materials. These admixtures are described for improving the flowability of the binders, such as, for example, cement, anhydrite or gypsum, and the building materials produced therewith.

In addition to the purely anionic dispersants which contain substantially carboxyl and sulfo groups, weakly anionic comb polymers which usually carry anionic charges on the main chain and contain nonionic polyalkylene glycol side chains are described.

WO-A-01/96007 describes these weakly anionic dispersants and grinding auxiliaries for aqueous mineral suspensions which are prepared by free radical polymerization of monomers containing vinyl groups and which contain polyalkylene oxide groups as a main component.

DE-A-19513126 and DE-A-19834173 describe copolymers based on unsaturated dicarboxylic acid derivatives and oxyalkylene glycol alkenyl ethers and the use thereof as admixtures for hydraulic binders, in particular cement.

DE-A-10017667 describes the use of similar copolymers with vinyl-functionalized polyethers for the preparation of aqueous pigment preparations. These copolymers are prepared by free radical polymerization of, inter alia, vinylpolyalkylene glycol ethers and maleic anhydride and further monomers and are suitable for dispersing organic and inorganic pigments and fillers and for the preparation of pigment concentrates, pastes and preparations.

The aim of the addition of superplasticizers in the building industry is either to increase the plasticity of the concrete or to reduce the amount of water required for the mixture comprising cement slurry, fly ash and aggregates under the same processing condition.

It has been found that superplasticizers based on ligninsulfonate, melamine sulfonate and polynaphthalenesulfonate are inferior to the weakly anionic, polyalkylene glycol ether-containing copolymers in efficacy. These copolymers are also designated as polycarboxylate ethers (PCE) in the building industry. The information brochure "Modern Superplasticisers in Concrete Technology, January 2007" of the Verein Deutsche Bauchemie e.V., Frankfurt am Main, describes the use and the advantages of these polycarboxylate ethers.

Polycarboxylate ethers disperse the inorganic pigment particles not only via electrostatic charge build-up owing to the anionic groups present on the main chain (carboxylate groups, sulfonate groups) but additionally stabilize the dispersed particles by steric effects owing to the polyalkylene glycol ether side chains which form a stabilizing protective layer around the pigment particle by absorption of water molecules.

As a result, either the required amount of water for establishing a certain consistency can be reduced compared with the classical superplasticizers or the plasticity of the moist building material mixture is reduced by the addition of the polycarboxylate ethers to such an extent that self-compacting concrete can be produced at low water/cement ratios. The use of the polycarboxylate ethers also permits the production of ready-mixed concrete which remains pumpable over relatively long periods or the production of high-strength concretes by establishing a low water/cement ratio.

It is therefore not surprising that the industry is still searching for suitable polymers which are suitable for use as concrete plasticizers and dispersants for inorganic pigments.

WO-A-02/066528 describes such a dispersant which is suitable as a water-reducing auxiliary for concrete. In particular, macromonomers which are available by alkoxylation of hydroxyalkyl acrylates and methacrylates in the presence of DMC (double metal cyanide) catalysts are used for the preparation of the dispersant.

Many formulations require a defoamer to be added yet the addition of defoamers frequently leads to disadvantageous effects. Pigment formulations frequently give rise here to surface defects (e.g. craters) and poor leveling and flow properties (e.g. orange peel effect), whereupon it is often necessary to use more by way of surfactants in order that these problems, caused by the defoamers, may be remedied. Similarly, when using known comb polymers as superplasticizers in concrete it is not possible to do without the addition of defoamers. Owing to the comblike surfactant structure of these polymers on incorporation, a considerable amount of air can be introduced into mineral type building products. Such air pores lead to cavities being formed in the concrete, and this can lead to worse mechanical properties and stability on the part of the concrete.

Many defoamers, moreover, also tend to separate, since they are generally insoluble in the formulations. This includes defoamers based on mineral oils or silicone oil.

The problem addressed by the present invention was therefore that of providing improved polymers useful as concrete superplasticizers and dispersants for inorganic pigments by using an additional building block in the polymer to inhibit foaming and thus eliminate the need to use a defoamer.

The present invention provides polymers containing structural units derived from monomers (A), (B) and (D), and optionally (C), wherein
(A) is a monomer of formula (I)

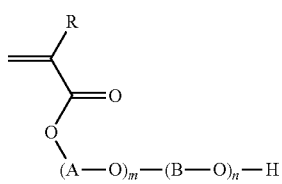

where
A represents $C_2$- to $C_4$-alkylene,
B represents a $C_2$- to $C_4$-alkylene other than A,
R represents hydrogen or methyl,
m represents a number from 1 to 500,
n represents a number from 1 to 500,
(B) is an ethylenically unsaturated monomer which contains at least one carboxylic acid function,
(C) optionally a further ethylenically unsaturated monomer other than (A) and (B),
(D) is a monomer of formula (II)

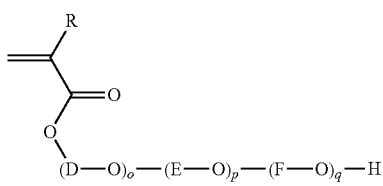

where
D represents $C_2$- to $C_4$-alkylene,
E represents a $C_2$- to $C_4$-alkylene group other than D,
F represents a $C_2$- to $C_4$-alkylene group other than E,
R represents hydrogen or methyl, represents a number from 1 to 500,
p represents a number from 1 to 500,
q represents a number from 1 to 500
and wherein the weight fraction of monomers is 35 to 98.5% in respect of monomer (A), 0.5 to 45% in respect of monomer (B), 0 to 20% in respect of monomer (C) and 1 to 20% in respect of monomer (D).

The present invention further provides for the use of the abovementioned polymers as a defoamer and dispersant for inorganic solid suspensions.

The present invention further provides a process for defoaming and dispersing inorganic solid suspensions by adding the above-described polymer to an inorganic solid suspension.

The alkylene oxide units $(A-O)_m$ and $(B-O)_n$ can be arranged either randomly or, as in the case of a preferred embodiment, blockwise. In a preferred embodiment, $(A-O)_m$ are propylene oxide units and $(B-O)_n$ are ethylene oxide units, or $(A-O)_m$ are ethylene oxide units and $(B-O)_n$ are propylene oxide units, the molar fraction of ethylene oxide units preferably being from 50 to 99%, in particular from 60 to 99%, particularly preferably from 70 to 99%, based on the sum (100%) of the ethylene oxide and propylene oxide units.

m is preferably a number from 1 to 150, in particular from 2 to 10. n is preferably a number from 3 to 300, in particular from 5 to 150. The sum of the alkylene oxide units n+m is preferably between 2 and 500, more preferably between 10 and 150.

Preferred monomers (B) include in particular monoethylenically unsaturated monomers. Examples of these are monoethylenically unsaturated mono- and dicarboxylic acids having 3 to 8 carbon atoms, such as acrylic acid, methacrylic acid, crotonic acid, isocrotonic acid, maleic acid and fumaric acid.

Preferred monomers (C) include monoethylenically unsaturated sulfonic acids and phosphonic acids and salts thereof, in particular alkali metal salts thereof, such as vinylsulfonic acid, allylsulfonic acid, methallylsulfonic acid, styrenesulfonic acid, 2-acryloyloxyethanesulfonic acid, 2-acrylamido-2-methylpropanesulfonic acid, vinylphosphonic acid, allylphosphonic acid, 2-acryloyloxyethanephosphonic acid and 2-acrylamido-2-methylpropanephosphonic acid. The monomers (C) further include monoallylpolyalkylene glycols.

The alkylene oxide units $(D-O)_o$, $(E-O)_p$ and $(F-O)_q$ can be arranged either randomly or, as in the case of a preferred embodiment, blockwise. In a preferred embodiment, $(D-O)_o$ represents propylene oxide units, $(E-O)_p$ represents ethylene oxide units and $(F-O)_q$ represents propylene oxide units, while the molar fraction of ethylene oxide units is preferably 10 to 90%, especially 20 to 80%, more preferably 30 to 70%, based on the sum total (100%) of ethylene oxide units and propylene oxide units.

o is preferably a number from 1 to 100, especially 2 to 10. p is preferably a number from 1 to 100, especially 5 to 50. q is preferably a number from 1 to 100, especially 2 to 40. The sum of alkylene oxide units o+p+q is preferably between 3 and 500, more preferably between 10 and 100.

In a preferred embodiment, the weight fractions of (A), (B) and (D) add up to 100 wt %.

In a further preferred embodiment, the weight fractions of (A), (B), (C) and (D) add up to 100 wt %.

In a further preferred embodiment, the weight fraction of monomer (A) in the polymer is between 50 and 80 wt %.

In a further preferred embodiment, the weight fraction of monomer (B) in the polymer is between 5 and 25 wt %.

In a further preferred embodiment, the weight fraction of monomer (C) in the polymer is between 1 and 25 wt %.

In a further preferred embodiment, the weight fraction of monomer (D) in the polymer is between 3 and 25 wt %.

The copolymer according to the invention may have customary terminal groups which form by the initiation of the free radical polymerization or by chain-transfer reactions or by chain termination reactions, for example a proton, a group from a free radical initiator or a sulfur-containing group from a chain-transfer agent.

The polymers of the present invention preferably have a molecular weight of $10^3$ g/mol to $10^9$ g/mol, especially up to $10^6$ g/mol, specifically $10^5$ g/mol.

An essential property of the polymers according to the present invention is that the polyalkylene glycol side chains of the polymer are not pure polyethylene glycols or polypropylene glycols. Instead, the polyalkylene glycols are either random or block polyalkylene glycols comprising propylene oxide and ethylene oxide units.

The polymers of the present invention are obtainable via free-radical polymerization of monomers (A), (B), (D) and optionally (C). Structural units derived from the monomers (A), (B), (D) and optionally (C) are the structural units of the polymer which are formed as a result of said monomers (A), (B), (D) and optionally (C) becoming incorporated via their ethylenic double bond. The polymerization reaction can be carried out as a continuous, batch or semicontinuous operation.

The polymerization reaction is preferably carried out as precipitation polymerization, emulsion polymerization, solution polymerization, mass polymerization or gel polymerization. Solution polymerization is particularly advantageous for the property profile of the copolymers according to the invention.

All organic or inorganic solvents which are very substantially inert with respect to free radical polymerization reactions, for example ethyl acetate, n-butyl acetate or 1-methoxy-2-propyl acetate, and alcohols, such as, for example, ethanol, isopropanol, n-butanol, 2-ethylhexanol or 1-methoxy-2-propanol, and likewise diols, such as ethylene glycol and propylene glycol, may serve as solvents for the polymerization reaction. Ketones, such as acetone, butanone, pentanone, hexanone and methyl ethyl ketone, alkyl esters of acetic, propionic and butyric acid, such as, for example, ethyl acetate, butyl acetate and amyl acetate, ethers, such as tetrahydrofuran, diethyl ether and ethylene glycol and polyethylene glycol monoalkyl ether and dialkyl ether, can also be used. Aromatic solvents, such as, for example, toluene, xylene or higher-boiling alkylbenzenes, may likewise be used. The use of solvent mixtures is also conceivable, the choice of the solvent or of the solvents depending on the intended use of the copolymer according to the invention. Water; lower alcohols; preferably methanol, ethanol, propanols, isobutanol, sec-butanol and tert-butanol, 2-ethylhexanol, butylglycol and butyldiglycol, particularly preferably isopropanol, tert-butanol, 2-ethylhexanol, butylglycol and butyldiglycol; hydrocarbons having 5 to 30 carbon atoms and mixtures and emulsions of the abovementioned compounds are preferably used.

The polymerization reaction is preferably effected in the temperature range from 0 to 180° C., particularly preferably from 10 to 100° C., both at atmospheric pressure and at elevated or reduced pressure. The polymerization can also optionally be carried out under an inert gas atmosphere, preferably under nitrogen.

High-energy, electromagnetic beams, mechanical energy or the customary chemical polymerization initiators, such as organic peroxides, e.g. benzoyl peroxide, tert-butyl hydroperoxide, methyl ethyl ketone peroxide, cumoyl peroxide, dilauroyl peroxide (DLP), or azo initiators, such as, for example, azodiisobutyronitrile (AIBN), azobisamidopropyl hydrochloride (ABAH) and 2,2'-azobis(2-methylbutyronitrile) (AMBN), can be used for initiating the polymerization. Inorganic peroxy compounds, such as, for example, $(NH_4)_2S_2O_8$, $K_2S_2O_8$ or $H_2O_2$, optionally in combination with reducing agents (e.g. sodium hydrogen sulfite, ascorbic acid, iron(II) sulfate) or redox systems which contain an aliphatic or aromatic sulfonic acid (e.g. benzenesulfonic acid, toluenesulfonic acid) as reducing component are likewise suitable.

The customary compounds are used as chain-transfer agents for regulating the molecular weight. Suitable known chain-transfer agents are, for example, alcohols, such as methanol, ethanol, propanol, isopropanol, n-butanol, sec-butanol and amyl alcohols, aldehydes, ketones, alkylthiols, such as, for example, dodecylthiol and tert-dodecylthiol, thioglycolic acid, isooctyl thioglycolate, 2-mercaptoethanol, 2-mercaptopropionic acid, 3-mercaptopropionic acid, and some halogen compounds, such as, for example, carbon tetrachloride, chloroform and methylene chloride.

The polymers according to the invention are preferably administered as 5-50% strength aqueous solution and particularly preferably as 20 to 45% strength aqueous solution, as dispersants, superplasticizers, sequestering agents or plasticizers, for the intended use.

A further administration form of the polymers according to the invention is powders or granules, which are prepared by drying the polymer solutions obtainable after the polymerization.

The polymers according to the invention are suitable as dispersants and superplasticizers for minerals, inorganic pigments, as dispersants for pigment preparations, tinting pastes for wall paints, printing inks, dispersants for pigment dispersions, e.g. titanium dioxide, calcium carbonate, kaolin, talc, dispersions in ceramic production, for the prevention of scale deposition, as additives for cleaning agents, as sequestering agents in the textile, paper and leather industry and as scale preventers for industrial water and in waste water treatment.

The polymers according to the invention are suitable as plasticizers and superplasticizers for hydraulic cement systems, such as, for example, Portland cement, lime marl, concrete, screed mortar, gypsum suspensions and anhydrous calcium sulfate binder formulations, for ceramic materials comprising clays, kaolins, feldspars and quartz minerals, calcium stearate and the sparingly water-soluble fatty acid salts of further divalent and polyvalent cations.

The polymers according to the invention are furthermore suitable as dispersants and deflocculants for inorganic pigments are, for example, titanium dioxides, zinc sulfides, zinc oxides, iron oxides, magnetites, manganese iron oxides, chromium oxides, ultramarine, nickel or chromium antimony titanium oxides, manganese titanium rutiles, cobalt oxides, mixed oxides of cobalt and aluminum, rutile mixed-phase pigments, sulfides of the rare earths, spinels of cobalt with nickel and zinc, spinels based on iron and chromium with copper, zinc and manganese, bismuth vanadates and extender pigments. In particular, the colour index pigments Pigment Yellow 184, Pigment Yellow 53, Pigment Yellow 42, Pigment Yellow Brown 24, Pigment Red 101, Pigment Blue 28, Pigment Blue 36, Pigment Green 50, Pigment Green 17, Pigment Black 11, Pigment Black 33 and Pigment White 6 are used. Frequently, mixtures of inorganic pigments are also preferably used. Mixtures of organic with inorganic pigments are likewise frequently used. The pigment dispersions prepared with the aid of the polymers according to the invention can be used as tinting pastes or pigment slurries, dispersions or preparations in the paint and coating industry, in the ceramic industry and, inter alia, in the textile and leather industry.

The polymers according to the invention are used in particular as dispersants for transparent iron oxide pigments, with which transparent aqueous or solvent-containing coatings for wood coating can be prepared.

The polymers according to the invention are preferably used in an amount of from 0.01 to 15 wt %, preferably 0.1 to 5 wt %, based on the weight of the inorganic pigments, including hydraulic binders, hydrated calcium sulfate (building industry) and the previously described minerals and inorganic pigments. In particular, 0.1-10 wt % and preferably 0.3-5 wt %, based on the inorganic pigments, are used for dispersing inorganic pigments in paints and coatings, pigment concentrates, slurries and pigment preparations.

A particular embodiment of the polymers according to the invention is the use as dispersant in aqueous emulsion paints. Aqueous emulsion paints contain various white pigments, in particular titanium dioxide, barium sulfate and zinc sulfite, colored pigments as described above, in particular iron oxide pigments, chromium dioxide and cobalt spinel pigments, fillers, such as natural or precipitated calcium carbonate, talc, kaolin, quartz powder and other mineral pigments. Emulsion polymers are used as binders for the white pigments and fillers. These emulsion polymers usually consist of polymers or copolymers of styrene, acrylates, methacrylates, acrylic acid, methacrylic acid, maleic diesters, vinyl acetate, vinyl isodecanoate, vinyl neodecanoate, vinyl isononanoate, vinyl chloride, butadiene and other olefinically unsaturated monomers. Further binders are aqueous alkyd resin dispersions, polyurethane dispersions, potassium waterglass for silicate paints, silicone resin dispersions and further aqueous polymer dispersions.

Usually, the polymers according to the invention are added to the aqueous paint in amounts of 0.05-5 wt %, based on the inorganic pigments and fillers, and, in a preferred form, in amounts of 0.1-1 wt %, based on the inorganic pigments and fillers.

Additives for scale prevention are used in industrial and waste waters, in the textile, leather and paper industry and in household and industrial cleaners. The polymers ethers according to the invention are suitable as dispersants and sequestering agents for alkaline earth metal carbonates and sulfates which are sparingly soluble in water. Suitable amounts used are 0.001-0.1 wt % of polymers in industrial waters and waste waters or 0.01-2 wt % of polymers, based on the liquors used in the textile, leather and paper industry or in the hygiene sector.

The polymers according to the invention are suitable in particular for use in the pretreatment, bleaching, desizing, boiling, mercerization of textiles, in particular of woven textile fabrics comprising cotton, linen, wool and manmade fibers and blended fabrics thereof, and for textile dyeing and high-grade finishing. Particularly in pretreatment and bleaching, the polymers according to the invention are suitable for preventing deposits on the woven fabrics and the machine elements.

The polymers according to the invention are also suitable for the preparation of liquid cleaning formulations which contain anionic, nonionic, amphoteric and cationic surfactants, the polymers according to the invention having the function of preventing the formation of scale in the liquor used. Possible examples of the use of the polymers according to the invention are vehicle care agents, industrial cleaners, dairy cleaners, butchers' cleaners, household floor care agents, dishwashing agents, liquid and pulverulent household detergents for textiles, sanitary cleaners, toilet cleaners and other cleaners in the household sector and in the commercial or industrial sector.

Usually, polymers of acrylic acid, copolymers of maleic acid and acrylic acid or chelating agents, such as aminotriacetic acid, ethylenediaminetetraacetate, aminotrismethylenephosphonic acid, diethylenetriaminepentamethylenephosphonic acid, 1-hydroxyethane-1,1-diphosphonic acid and the sodium and potassium salts thereof, which, owing to their ionic characters, are not very miscible with surfactants, are used as limestone preventers. The polycarboxylates according to the invention on the other hand are distinguished by good compatibility with anionic, nonionic, amphoteric and cationic surfactants and are therefore suitable for the preparation of liquid cleaning agent formulations.

A further use of the polymers according to the invention as dispersants for abrasives, e.g. for silicon carbide, is suitable for the chemical mechanical planarization of silicon wafers.

Further applications of the polymers according to the invention as dispersants and limestone preventers are crop protection formulations, cooling lubricants in metal processing, waste water treatment, mineral oil extraction, mineral oil cracking and ore dressing.

If appropriate, the polymers according to the invention are combined in combination with further surface-active substances. The aim of this combination is an improvement in the properties of the use formulation. Suitable surface-active substances may be, for example, wetting agents in the building industry and further wetting and dispersing additives in the paint and coating industry and for pigment preparations, slurries or dispersions.

Thus, in preferred embodiments, the use formulations according to the invention optionally contain one or more nonionic surfactants from the group consisting of the alkylphenolpolyethylene glycol ethers, styrene-substituted phenolpolyethylene glycol ethers, alkylpolyethylene glycol ethers, alkylamine ethoxylates of primary alkylamines having a carbon chain length of 8 to 22 carbon atoms, fatty acid polyethylene glycol ethers, fatty acid polyglycosides, alkylpolyalkylglycol ethers of $C_8$-$C_{22}$-alcohols which were reacted blockwise with ethylene oxide and propylene oxide, endcapped alkyl ethoxylates of $C_8$-$C_{22}$-alcohols which were reacted with ethylene oxide and were etherified with methyl chloride, butyl chloride or benzyl chloride, ethylene/propylene glycol block polymers and sorbitan ester polyethylene glycol ethers.

In a further preferred embodiment, the use formulations according to the invention optionally contain one or more anionic surfactants from the group consisting of the sodium, potassium and ammonium salts of fatty acids, sodium alkylbenzenesulfonates, sodium alkylsulfonates, sodium olefinsulfonates, sodium polynaphthalenesulfonates, sodium ligninsulfonate, sodium dialkyldiphenyl ether disulfonates, sodium, potassium and ammonium alkylsulfates, sodium, potassium and ammonium alkylpolyethylene glycol ether sulfates, sodium, potassium and ammonium alkylphenolpolyethylene glycol ether sulfates, sodium, potassium and ammonium mono- and dialkylsulfosuccinates and monoalkylpolyoxethyl-sulfosuccinates, and alkylpolyethylene glycol ether phosphoric acid mono-, di- and triesters and mixtures thereof and alkylphenolpolyethylene glycol ether phosphoric acid mono-, di- and triesters and mixtures thereof and the sodium, potassium and ammonium salts thereof, alkylpolyethylene glycol ether carboxylic acids and the sodium, potassium and ammonium salts thereof, sulfuric monoesters and phosphoric esters of styrene-substituted phenol ethoxylates, styrene-substituted phenolpolyethylene glycol ether carboxylic acids and their sodium, potassium and ammonium salts, sodium fatty acid isethionates, sodium fatty acid methyltaurides and sodium fatty acid sarcosides.

In a further preferred embodiment, the use formulations according to the invention optionally contain one or more solvents, hydrotropic substances, viscosity modifiers or humectants selected from the group consisting of the glycol ethers, in particular polyethylene glycol ether or polypropylene glycol ether having an average molar mass of from 200 to 2000 g/mol, mono-, di- or triethylene glycol, mono-, di- or tripropylene glycol, methyl-, ethyl-, propyl- or butylpolyalkylene glycol ethers or higher-functional alkylpolyalkylene glycol ethers having 1, 2, 3 or more ethylene glycol or propylene glycol units, such as, for example, methoxypropanol, dipropylene glycol monomethyl ether, tripropylene glycol monomethyl ether, ethylene glycol monobutyl ether, diethylene glycol monobutyl ether, butylpolyethylene glycol ether, propylpolyethylene glycol ether, ethylpolyethylene glycol ether, methylpolyethylene glycol ether, dimethylpolyethylene glycol ether, dimethylpolypropylene glycol ether, glyceryl ethoxylates having a molecular weight of from 200 to 20 000 g/mol, pentaerythrityl alkoxylates and further ethoxylation and alkoxylation products and random or block copolymers which were prepared by an addition reaction of ethylene oxide and/or propylene oxides with monohydric and higher-hydric alcohols.

Further water-soluble organic or hydrotropic substances which can be combined with the copolymers according to the invention and which optionally also serve as solvents, consistency regulators or rheology additives are, for example, formamide, urea, tetramethylurea, c-caprolactam, glycerol, diglycerol, polyglycerol, N-methylpyrrolidone, 1,3-diethyl-2-imidazolidinone, thiodiglycol, sodium benzenesulfonate, sodium xylenesulfonate, sodium toluenesulfonate, sodium cumenesulfonate, sodium dodecylsulfonate, sodium benzoate, sodium salicylate, sodium butyl monoglycol sulfate, gelatin derivatives, cellulose derivatives, such as, for example, methylcellulose, hydroxyethylcellulose ether, methoxyethylcellulose ether, methoxypropylcellulose ether, polyvinylpyrrolidone, polyvinyl alcohol, polyvinylimidazole and co- and terpolymers of vinylpyrrolidone, vinyl acetate and vinylimidazole, it being possible for the polymers having vinyl acetate building blocks subsequently to be subjected to hydrolysis to the vinyl alcohol.

Antisettling agents, light stabilizers, antioxidants, fillers, milling auxiliaries, viscosity stabilizers and additives which advantageously influence the rheology are suitable as further customary additives. For example, starch derivatives and cellulose derivatives and hydrophobically modified ethoxylated urethane (HEUR) thickeners are suitable as agents for regulating the viscosity. Suitable pH regulators are organic or inorganic bases and acids. Preferred organic bases are amines, such as, for example, ethanolamine, diethanolamine, triethanolamine, N,N-dimethyl-ethanolamine, diisopropylamine, aminomethylpropanol or dimethylaminomethyl-propanol. Preferred inorganic bases are sodium, potassium or lithium hydroxide or ammonia.

TABLE 1

Synthesis examples (use quantities = polymer compositions in grams)

| | | Synthesis Example No. | | | | | | | |
|---|---|---|---|---|---|---|---|---|---|
| | | 1 | 2 | 3 | 4 | 5 | 6 | 7 | 8 |
| Monomer A | Polyglycol 1 | — | — | — | — | — | — | — | — |
| | Polyglycol 2 | 608 | 925 | 231 | 231 | 641 | 244 | 244 | 244 |
| Monomer B | Methacrylic acid | 67.6 | 108 | 27.0 | 27.0 | 71.3 | 28.5 | 28.5 | 28.5 |
| Monomer C | Sodium methallylsulfonate | 61.0 | 97.6 | 24.4 | 24.4 | — | — | — | — |
| | Methyl methacrylate | — | — | — | — | 37.5 | 15.0 | 15.0 | 15.0 |
| Monomer D | Polyglycol 5 | — | 48.7 | — | — | — | 12.8 | — | — |
| | Polyglycol 6 | — | — | 12.2 | — | — | — | 12.8 | — |
| | Polyglycol 7 | — | — | — | 12.2 | — | — | — | 12.8 |
| Initiator | Sodium persulfate | 5.66 | 9.32 | 2.33 | 2.30 | 8.20 | 2.78 | 2.80 | 2.84 |
| CTA | 2-Mercaptopropionic acid | 4.0 | 6.4 | 1.6 | 1.6 | 9.15 | 3.03 | 3.03 | 3.03 |
| Solvent | Water | 1130 | 1800 | 450 | 449 | 1180 | 464 | 464 | 464 |
| | $M_w$ of polymer | 27000 | 29000 | 29000 | 29000 | 20000 | 22000 | 22000 | 25000 |

| | | Synthesis Example No. | | | | | | | |
|---|---|---|---|---|---|---|---|---|---|
| | | 9 | 10 | 11 | 12 | 13 | 14 | 15 | 16 |
| Monomer A | Polyglycol 1 | 1510 | 257 | 257 | 257 | 960 | 228 | 228 | 228 |
| | Polyglycol 2 | — | — | — | — | — | — | — | — |
| Monomer B | Methacrylic acid | 379 | 30.0 | 30.0 | 30.0 | 180 | 45.0 | 45.0 | 45.0 |
| Monomer C | Sodium methallylsulfonate | 171 | — | — | — | — | — | — | — |
| | Methyl methacrylate | — | — | — | — | 60.0 | 15.0 | 15.0 | 15.0 |
| Monomer D | Polyglycol 5 | — | 13.5 | — | — | — | 12.0 | — | — |
| | Polyglycol 6 | — | — | 13.5 | — | — | — | 12.0 | — |
| | Polyglycol 7 | — | — | — | 13.5 | — | — | — | 12.0 |
| Initiator | Sodium persulfate | 15.9 | 3.00 | 2.82 | 2.81 | 11.3 | 2.87 | 2.70 | 2.89 |
| CTA | 2-Mercaptopropionic acid | 11.2 | 3.03 | 3.03 | 3.03 | 12.1 | 3.03 | 3.03 | 3.03 |
| Solvent | Water | 3140 | 466 | 466 | 465 | 1860 | 465 | 465 | 466 |
| | $M_w$ of polymer | 10000 | 23000 | 20000 | 23000 | 20000 | 17000 | 25000 | 17000 |

Composition of monomer A:
Polyglycol 1 polyalkylene glycol monomethacrylate (formula (I), m = 5, n = 36-38; (A—O) is (CH$_2$CH(CH$_3$)O)), (B—O) is (CH$_2$CH$_2$O)), molar mass about 2000 g/mol
Polyglycol 2 polyalkylene glycol monomethacrylate (formula (I), m = 5, n = 104-106; (A—O) is (CH$_2$CH(CH$_3$)O)), (B—O) is (CH$_2$CH$_2$O)), molar mass about 5000 g/mol
Composition of monomer D:
Polyglycol 5 polyalkylene glycol monomethacrylate (formula (II), o = 4-5, p = 19-21, q = 15-17; (D—O) is [CH$_2$CH(CH$_3$)O)], (E—O) is (CH$_2$CH$_2$O), (F—O) is [CH$_2$CH(CH$_3$)O)], molar mass about 2200 g/mol
Polyglycol 6 polyalkylene glycol monomethacrylate (formula (II), o = 4-5, p = 9-11, q = 15-17; (D—O) is [CH$_2$CH(CH$_3$)O)], (E—O) is (CH$_2$CH$_2$O), (F—O) is [CH$_2$CH(CH$_3$)O)], molar mass about 1700 g/mol
Polyglycol 7 polyalkylene glycol monomethacrylate (formula (II), o = 4-5, p = 19-21, q = 21-23; (D—O) is [CH$_2$CH(CH$_3$)O)], (E—O) is (CH$_2$CH$_2$O), (F—O) is [CH$_2$CH(CH$_3$)O)], molar mass about 2500 g/mol Synthesis of Polymers A glass flask is charged with monomer (A), monomer (B), monomer (C), monomer (D) and the chain-transfer agent (CTA) in solvent under nitrogen. The reaction mixture is then heated to 75° C. and initiator (the stated amount dissolved in water to obtain a concentration of 6.35 wt %) is metered in. On completion of the addition the mixture is stirred at 75° C. for a further hour. It is then cooled down to room temperature and adjusted with sodium hydroxide solution (50 wt % in water) to pH 5.5. The polymer solutions were adjusted to an active content of 40%.

Comparative Examples without monomer (D): See table: Polymer Nos. 1, 5, 9 and 13.

USE EXAMPLES

In the examples which follow, percentages are weight percent, unless otherwise stated.

Use Examples 1

The foam behavior of the polymers was investigated using a frit test and compared with that of polymers prepared without monomer (D). The in-test solution consisted of completely ion-free water (98.1%), adjusted to pH 12 with NaOH (0.8%) and to 150° German water hardness with $CaCl_2 \cdot 2H_2O$ (0.4%) and thickened with Tylose H100000 (0.7%). The polymer solution to be tested was added to the in-test solution in an amount of 5 g of polymer solution per 1 l of in-test solution and then air was blown through the frit at a volume flow rate of 30 l/h. Foam buildup was recorded after 1 minute and the subsequent collapse of the foam was recorded after 1, 2 and 5 minutes.

TABLE 2

| | | | | | |
|---|---|---|---|---|---|
| Use Examples 1 | | | | | |
| Example | Polymer of Example | Buildup of foam in ml after 1 min | 1 min | 2 min | 5 min |
| | | | Collapse of foam in ml after | | |
| 17 | 2 | 700 | 590 | 490 | 250 |
| 18 | 3 | 30 | 30 | 20 | 10 |
| 19 | 4 | 20 | 30 | 30 | 20 |
| 20 | 6 | 900 | 700 | 520 | 80 |
| 21 | 7 | 750 | 630 | 510 | 200 |
| | | | Collapse of foam in ml nach | | |
| 22 | 8 | 840 | 670 | 530 | 190 |
| 23 | 10 | 510 | 300 | 190 | 40 |
| 24 | 11 | 470 | 210 | 70 | <10 |
| 25 | 12 | 840 | 670 | 530 | 190 |
| 26 | 14 | 920 | 690 | 460 | 60 |
| 27 | 15 | 110 | 50 | 20 | 10 |
| 28 | 16 | 690 | 510 | 380 | 50 |

Use Examples 2

Foaming in mortar leads to high air pore contents. To demonstrate the efficacy of monomers (D) incorporated in the polymer in suppressing foam in mortar, these copolymers were used in the mortar as superplasticizers and the air pore content was compared with that of a mortar where a comparable copolymer without this monomer (D) was used.

To determine the air pore content in mortar, first a mortar having the following composition was prepared:

| | |
|---|---|
| 540 g | of cement (CEM II/A-S 32.5 R) |
| 1350 g | of CEN standard sand (to DIN EN 196-1) |
| 221.5 g | of water |
| 2.6 g | of polymer solution |

Thereafter, the air content of the fresh mortar was determined in the air pore measuring pot by the pressure equalization method of DIN EN 1015-7:

TABLE 3

| | | |
|---|---|---|
| Use Examples 2 | | |
| Example | Polymer of Example | Air pore content in mortar [%] |
| 29 | 1 | 49 |
| 30 | 2 | 37 |
| 31 | 3 | 23 |
| 32 | 4 | 38 |
| 33 | 5 | 61 |
| 34 | 6 | 53 |
| 35 | 7 | 26 |
| 36 | 8 | 44 |
| 37 | 9 | 48 |
| 38 | 10 | 47 |
| 39 | 11 | 13 |
| 40 | 12 | 47 |
| 41 | 13 | 74 |
| 42 | 14 | 55 |
| 43 | 15 | 19 |
| 44 | 16 | 60 |

To also show that the performance of the superplasticizer is not impaired by incorporating monomer (D), the slump of this mortar was determined 5, 30 and 60 min following addition of polymer solutions (determination similarly to DIN EN 1015-3). The results confirm that the incorporation of monomer (D) in the polymer has scarcely any effect on slump.

TABLE 4

| | | | | |
|---|---|---|---|---|
| Slump | | | | |
| Example | Polymer of Example | Slump [cm] after 5 min | Slump [cm] after 30 min | Slump [cm] after 60 min |
| 45 | 1 | 26.1 | 23.4 | 21.4 |
| 46 | 2 | 27.4 | 26.5 | 24.5 |
| 47 | 3 | 28.4 | 26.6 | 24.4 |
| 48 | 4 | 28.1 | 27.1 | 26.3 |
| 49 | 5 | 23.1 | 22.5 | 22.4 |
| 50 | 6 | 24.8 | 24.0 | 22.8 |
| 51 | 7 | 26.9 | 23.3 | 22.0 |
| 52 | 8 | 25.4 | 24.5 | 23.4 |
| 53 | 9 | 24.8 | 23.3 | 21.8 |
| 54 | 10 | 24.0 | 22.7 | 21.7 |
| 55 | 11 | 28.3 | 25.3 | 24.3 |
| 56 | 12 | 27.0 | 25.8 | 24.8 |
| 57 | 13 | 24.3 | 24.0 | 23.5 |
| 58 | 14 | 26.8 | 25.3 | 25.3 |
| 59 | 15 | 29.0 | 28.0 | 25.3 |
| 60 | 16 | 26.5 | 26.5 | 26.0 |

What is claimed is:

1. A polymer containing structural units derived from monomers (A), (B) and (D), wherein (A) is a monomer of formula (I)

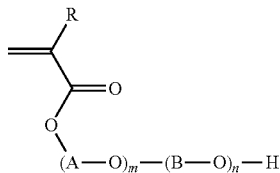

where
A is $C_2$- to $C_4$-alkylene,
B is a $C_2$- to $C_4$-alkylene other than A,
R is hydrogen or methyl,
m is a number from 1 to 500,
n is a number from 1 to 500,
(B) is an ethylenically unsaturated monomer which contains at least one carboxylic acid function,
(D) is a monomer of formula (II)

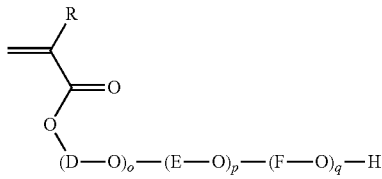

where
D is $C_2$- to $C_4$-alkylene,
E is a $C_2$- to $C_4$-alkylene group other than D,
F is a $C_2$- to $C_4$-alkylene group other than E,
R is hydrogen or methyl,
is a number from 1 to 500,
P is a number from 1 to 500,
q is a number from 1 to 500
and wherein the weight fraction of monomers is 35 to 98.5% in respect of monomer (A), 0.5 to 45% in respect of monomer (B), and 1 to 20% in respect of monomer (D).

2. The polymer as claimed in claim 1, wherein $(A\text{-}O)_m$ is a propylene oxide unit and $(B\text{-}O)_n$ is an ethylene oxide unit, or $(A\text{-}O)_m$ is an ethylene oxide unit and $(B\text{-}O)_n$ is a propylene oxide unit, and the molar fraction of ethylene oxide units is from 50 to 99 wt % based on the sum total (100%) of all ethylene oxide and propylene oxide units $(A\text{-}O)_m$ and $(B\text{-}O)_n$.

3. The polymer as claimed in claim 1, wherein m is a number from 1 to 150.

4. The polymer as claimed in claim 1, wherein n is a number from 3 to 300.

5. The polymer as claimed in claim 1, wherein n+m is between 2 and 500.

6. The polymer as claimed in claim 1, monomer (B) is selected from the group consisting of monoethylenically unsaturated mono- and dicarboxylic acids having 3 to 8 carbon atoms.

7. The polymer as claimed in claim 1, further comprising (C) an ethylenically unsaturated monomer other than (A) and (B), wherein monomer (C) is selected from the group consisting of monoethylenically unsaturated sulfonic acids, phosphonic acids and/or their salts, and monoallyl polyalkylene glycols.

8. The polymer as claimed in claim 7, wherein monomer (C) is in an amount of at least 0.5 wt % and monomer (A) is in an amount of at most 98 wt %.

9. The polymer as claimed in claim 1, wherein the alkylene oxide units $(D\text{-}O)_o$, $(E\text{-}O)_p$ and $(F\text{-}O)_q$ are in a block type arrangement and $(D\text{-}O)_o$ is a propylene oxide unit, $(E\text{-}O)_p$ is a ethylene oxide unit and $(F\text{-}O)_q$ is a propylene oxide unit, and wherein the molar fraction of ethylene oxide units is 10 to 90% based on the sum total (100%) of ethylene oxide and propylene oxide units $(D\text{-}O)_o$, $(E\text{-}O)_p$ and $(F\text{-}O)_q$.

10. The polymer as claimed in claim 1, wherein o is a number from 1 to 100.

11. The polymer as claimed in claim 1, wherein p is a number from 1 to 100.

12. The polymer as claimed in claim 1, wherein q is a number from 1 to 100.

13. The polymer as claimed in claim 1, wherein the sum o+p+q is between 3 and 500.

14. The polymer as claimed in claim 1 having a molecular weight of $10^3$ g/mol to $10^9$ g/mol.

15. A defoamer or dispersant for inorganic solid suspensions comprising the polymer as claimed in claim 1, in an amount of 0.01 to 15 wt %, based on the weight of the inorganic solid suspension.

16. A process for defoaming and dispersing inorganic solid suspensions comprising the step of adding to an inorganic solid suspension at least one polymer as claimed in claim 1, in an amount of 0.01 to 15 wt %, based on the weight of the inorganic solid suspension.

17. The polymer as claimed in claim 1 having a molecular weight of $10^3$ g/mol to $10^6$ g/mol.

18. The polymer as claimed in claim 1 having a molecular weight of $10^5$ g/mol.

* * * * *